(12) United States Patent
Fishteyn et al.

(10) Patent No.: US 7,171,130 B2
(45) Date of Patent: Jan. 30, 2007

(54) OPTICAL PERFORMANCE MONITOR UTILIZING NONLINEAR DETECTION

(75) Inventors: Michael Fishteyn, Bridgewater, NJ (US); Tsing Hua Her, New Providence, NJ (US); Stephan F. Wielandy, Hillsborough, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 749 days.

(21) Appl. No.: 10/242,589

(22) Filed: Sep. 12, 2002

(65) Prior Publication Data

US 2004/0052522 A1    Mar. 18, 2004

(51) Int. Cl.
*H04B 10/06* (2006.01)
*H04B 10/08* (2006.01)

(52) U.S. Cl. .......................... 398/212; 398/28; 398/34

(58) Field of Classification Search .................. 398/29, 398/33, 34, 212
See application file for complete search history.

(56) References Cited

U.S. PATENT DOCUMENTS

| 5,471,334 A | * | 11/1995 | Masuda et al. ............. 359/337 |
| 5,986,782 A | * | 11/1999 | Alexander et al. ............ 398/26 |
| 6,925,262 B2 | * | 8/2005 | Ooi et al. ................... 398/147 |

* cited by examiner

*Primary Examiner*—Leslie Pascal

(57) ABSTRACT

An optical performance monitor particularly well-suited for use in dense wavelength-division multiplexed (DWDM) systems includes both a nonlinear optical detector and a conventional linear detector. The nonlinear optical detector, which may comprise a quadratic detector, is used to provide information, on a channel-by-channel basis, regarding chromatic dispersion, polarization mode dispersion and accumulated amplified spontaneous emission (ASE) noise in each signal wavelength.

11 Claims, 4 Drawing Sheets

SCHEMATIC FOR NONLINEAR OPTICAL MONITOR

SCHEMATIC FOR NONLINEAR OPTICAL MONITOR

EXPERIMENTAL SETUP FOR INVESTIGATING DISPERSION DEPENDENCE OF APD SIGNAL

EXPERIMENTAL MEASUREMENT OF THE NONLINEAR APD SIGNAL DEPENDENCE ON PULSEWIDTH

EXPERIMENTAL AND SIMULATED DATA SHOWING THE
DEPENDENCE OF APD SIGNAL ON PMD IMPAIRMENT

EXPERIMENTAL SETUP FOR INVESTIGATING
OSNR SENSITIVITY OF APD

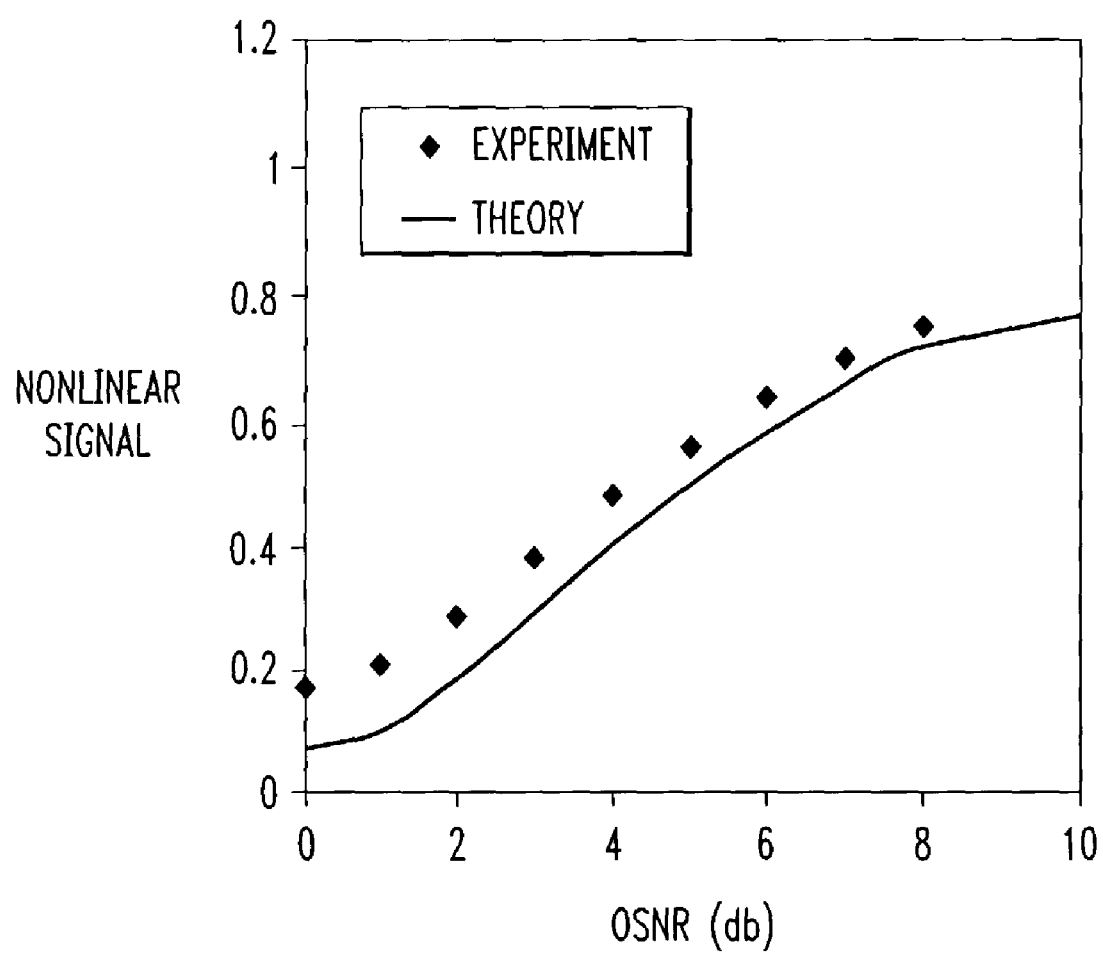

OPTICAL PERFORMANCE MONITOR UTILIZING NONLINEAR DETECTION

TECHNICAL FIELD

The present invention relates to an optical performance monitor useful in optical communication systems and, more particularly, to the use of both a linear detector and a nonlinear detector at the monitor output to ascertain noise and dispersion problems in the optical signals.

BACKGROUND OF THE INVENTION

Comprehensive optical performance monitoring in dense wavelength-division-multiplexed (DWDM) transmission systems offers the possibility of significant benefits, including real-time system optimization to improve performance, as well as fault isolation to reduce required repair time in the event of a failure.

In general, wavelength division multiplexing (WDM) is a technique which substantially increases the capacity of existing fiber optic networks. In a WDM system, plural optical channels are carried over a single waveguide (e.g., fiber), each channel being assigned a particular wavelength. Using optical amplifiers, such as doped fiber amplifiers, plural optical channels are directly amplified simultaneously, facilitating the use of WDM systems in long-distance optical networks. Dense WDM (DWDM) refers to arrangements that utilize a relatively close wavelength spacing between adjacent channels. Current DWDM systems carry up to 160 channels spaced as closely as 50 GHz apart, with a channel power as low as −30 dBm (before being amplified).

Optical performance monitors (OPMs) in current DWDM transmission systems usually combine some type of wavelength-selective filtering device (such as a Fabry-Perot filter or a diffraction grating) with one or more conventional (slow) optical detectors. The OPM thus "tunes" through the various wavelengths with the filter and uses the detector to measure the power in each channel, as well as other quantities of interest such as the optical signal-to-noise ratio (OSNR). Various techniques have been developed in the art to improve the measuring capabilities of OPMs, particularly with regard to measuring OSNR. U.S. Pat. No. 5,986,782 issued to Alexander et al. on Nov. 16, 1999, discloses an arrangement that utilizes separate power meters for each wavelength so as to measure the OSNR for each channel by measuring the optical noise level at a wavelength near, yet separated from, each DWDM channel wavelength.

There remain various characteristics of an optical signal that cannot be measured with a conventional OPM, such as accumulated chromatic dispersion, polarization mode dispersion and the accumulation of in-band amplified spontaneous emission (ASE) noise within the bandwidth of a DWDM channel. The use of a sufficiently high-speed detector in an OPM would allow for these various characteristics to be measured, but the high cost (and is some cases, technical difficulty) of such a detector precludes the possibility of widespread use of such an OPM in commercial systems.

Thus, a need remains in the art for an accurate, yet economical, arrangement for enhancing the operation of an OPM to include the measurement of time-domain distortions such as chromatic dispersion, polarization mode dispersion and accumulated in-band ASE noise.

SUMMARY OF THE INVENTION

The need remaining in the prior art is addressed by the present invention, which relates to an optical performance monitor useful in optical communication systems and, more particularly, to the use of both a linear detector and a nonlinear detector at the monitor output to ascertain noise and dispersion problems in the DWDM signals.

In accordance with the present invention, a wavelength-selective device (such as a Fabry-Perot filter or diffraction grating) is first used to select out a particular wavelength to be measured from a tapped-out portion of a DWDM signal. The selected wavelength is then applied as an input to both a conventional linear detector as used in prior art OPMs and a nonlinear optical detector (such as a two-photon absorbing photodiode). The conventional linear detector is used with the filter to determine the selected channel wavelength, power and OSNR. The nonlinear detector is used to determine chromatic dispersion, polarization mode dispersion and the accumulated ASE in the particular channel wavelength selected by the filter.

In a preferred embodiment of the present invention, a detector with quadratic dependence on input power is used as the nonlinear detector, although any other suitable nonlinear device could also be used. Moreover, it is possible to use the nonlinear detector in combination with the wavelength-selective device without also using the conventional linear detector, so as to provide a useful measure of the time-dependent dispersion and noise characteristics of the selected wavelength.

Other and further embodiments and aspects of the present invention will become apparent during the course of the following discussion and by reference to the accompanying drawings.

BRIEF DESCRIPTION OF THE DRAWINGS

Referring now to the drawings,

FIG. 7 contains a graph of the experimental and predicted measurements of the nonlinear optical detector signal dependence on OSNR.

DETAILED DESCRIPTION

Figure 1:
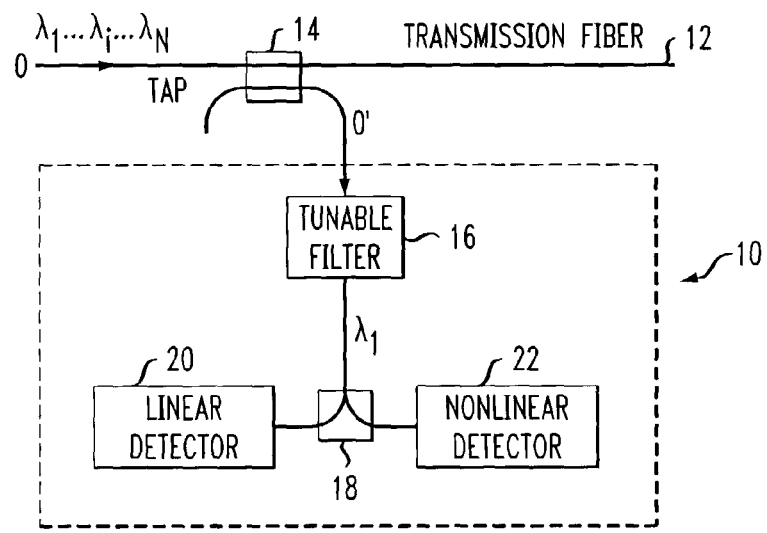
FIG. 1 illustrates an exemplary optical performance monitor formed in accordance with the present invention, utilizing both a linear optical detector and a nonlinear optical detector.

FIG. 1 illustrates, in a general block diagram form, an exemplary optical performance monitor (OPM) 10 formed in accordance with the present invention, for use with a DWDM transmission system. An exemplary transmission fiber 12 is illustrated as supporting an optical signal O comprising a plurality of channels, each operating at a separate wavelength, denoted as $\lambda_1, \lambda_2, ..., \lambda_N$. A conventional signal tap 14 is used to remove a relatively small amount of optical signal O (for example, 5–10%) and direct this tapped-off signal O' toward OPM 10. OPM 10 includes a wavelength-selective filter 16 (that may be tuned) to separate out a particular channel for study. For example, a Fabry-Perot filter or a diffraction grating, both well-known devices, may be used for this purpose. in the particular illustration of FIG. 1, wavelength-selective filter 16 has been configured to allow only the signal operating at $\lambda_1$ to be measured. It is to be understood that wavelength-selective filter 16 is tunable/adjustable so that each channel may be separately measured and analyzed. In accordance with the present invention, the tapped-off signal at wavelength $\lambda_1$ is subsequently passed through a 50:50 splitter 18, and simultaneously applied as an input to both a linear optical detector 20 and a nonlinear optical detector 22.

Linear optical detector 20, which may comprise an ordinary photodiode, functions in a similar manner as prior art detectors to measure only the incident continuous wave (CW) power, thus defining parameters such as channel wavelength, channel power and optical signal-to-noise ratio (OSNR). As mentioned above, however, cost-effective linear detectors, such as detector 20, are known to be too slow to time-resolve the data stream propagating in fiber 12. These time-domain data measurements are provided, in accordance with the present invention, by using a nonlinear optical detector in parallel with the linear detector so as to provide for an entire array of useful information about the propagating optical signal.

Although nonlinear detector 22 could, in principle, comprise any device that exhibits a nonlinear dependence on the input power of the optical signal, a preferred nonlinear detector is approximately quadratic and thus produces an output signal $S_{NL}$ that is proportional to the square of the input power $P_{in}$, that is:

$$S_{NL} \propto (P_{in})^2.$$

In a preferred embodiment, a photon-counting silicon avalanche photodiode is sued as nonlinear detector 22. Illuminating this detector with a focused beam of light having a wavelength in the vicinity of 1.5 microns has been found to produce an electrical pulse stream with an average frequency proportional to the input optical power raised to power of 1.7, a slight deviation from the presumed quadratic relationship.

As will be discussed in detail below in association with FIGS. 2–7, the utilization of nonlinear detector 22 in OPM 10 provides time domain information about the applied channel signal in terms of: (1) signal pulsewidth distortion due to chromatic dispersion; (2) signal pulse splitting due to polarization mode dispersion; and (3) signal degradation due to the presence of in-band optical noise. Moreover, the general principle of nonlinear detection is inherently bit-rate independent and scalable, and can therefore be used for extremely high bit rate systems (e.g., in excess of 160 Gb/s), for which no high-speed detectors and electronics currently exist. Lastly, it is to be understood that an OPM of the present invention may also be formed to include only a nonlinear detector, allowing for a direct signal path from the wavelength-selective device to the nonlinear detector.

Figure 2:
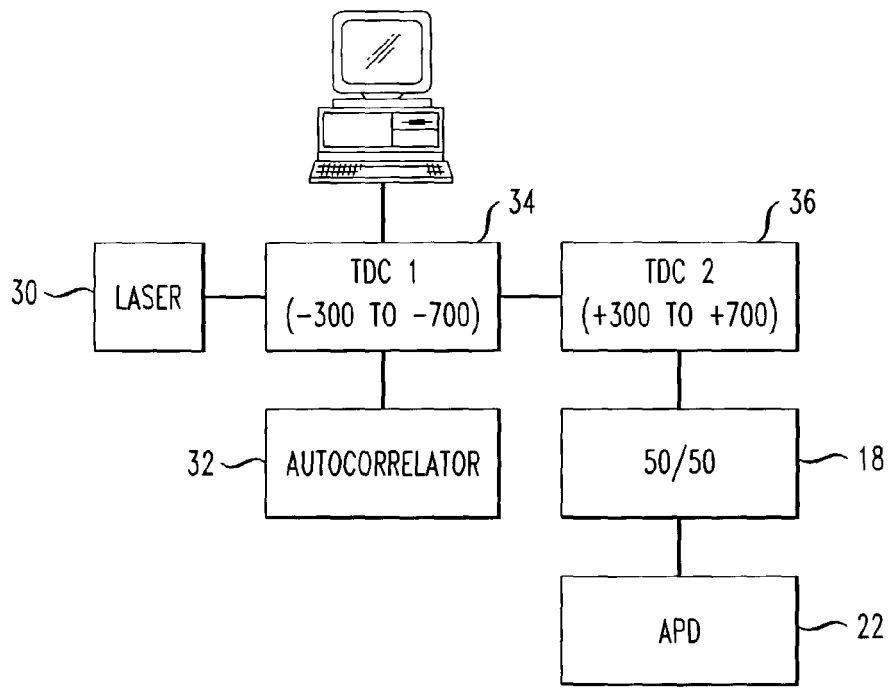
FIG. 2 illustrates a particular experimental arrangement for characterizing the chromatic dispersion measurement capability of the nonlinear optical detector of FIG. 1.
Figure 3:
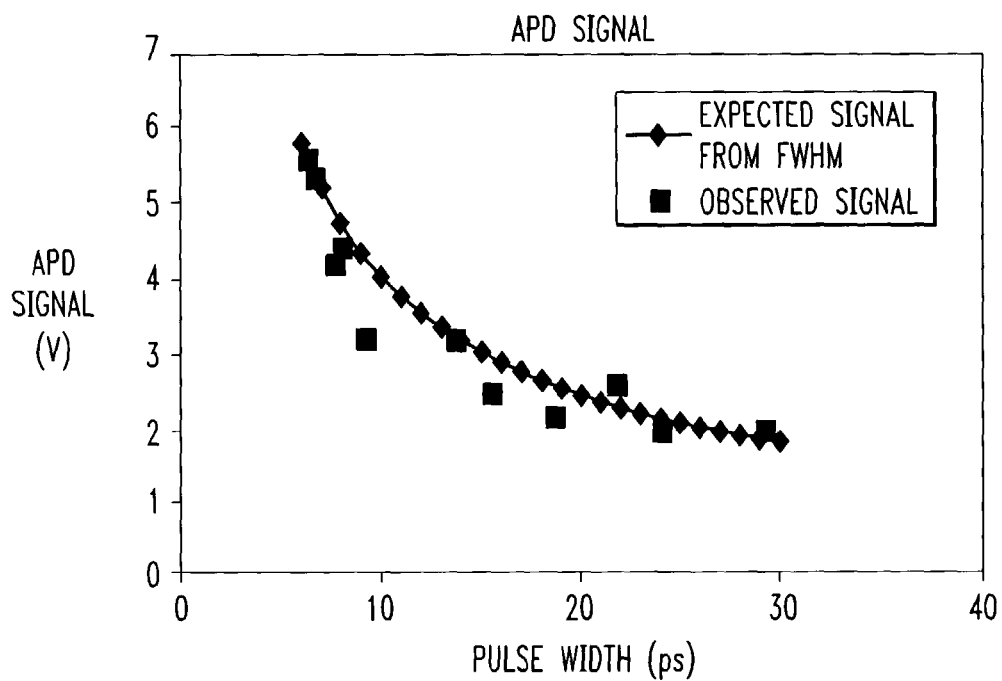
FIG. 3 contains a graph depicting both the measured and expected nonlinear detector output as a function of pulse-width.

Referring now to FIGS. 2 and 3, the capability of a nonlinear detector in an OPM to determine signal pulse-width distortion will be described. In general, consider a pulsed optical input with a defined bit period T and pulse distortion $\tau$. It is presumed that the optical pulse has a constant power $P_{peak}$ during the pulse duration $\tau$ so that the average power can be expressed as follows:

$$S_{NL} = \eta P_{peak}^2 \tau$$
$$= \eta \left( P_{ave} \cdot \frac{T}{\tau} \right)^2 \tau$$
$$= \eta T^2 P_{ave}^2 \cdot \frac{1}{\tau},$$

The per-pulse nonlinear signal, averaged over many pulses, will then obey the following relation:

$$P_{ave} = P_{peak} \frac{\tau}{T}$$

where $\eta$ is a proportionality constant related to the sensitivity of nonlinear detector 22. The result is that the nonlinear signal $S_{NL}$ is inversely proportional to the pulse duration $\tau$. For a constant detection sensitivity $\eta$, and a fixed bit period T, the nonlinear output signal $S_{NL}$ is used as an absolute measurement of $\tau$, as long as it is normalized by dividing by $(P_{ave})^2$; the power measured by conventional linear detector 20. That is, $$\tau = \frac{(\eta T^2) P_{ave}^2}{S_{NL}}$$

The arrangement of FIG. 2 can be used to determine the ability of a nonlinear optical detector, such as a photon-counting silicon avalanche photodiode 22, to characterize the chromatic dispersion present in an optical input signal. In this case, it is shown that it is possible to infer the width of a stream of optical pulses by measuring the nonlinear response to an applied input signal. Referring to FIG. 2, a laser source 30 was used to generate 4 ps pulses at a repetition rate of 10 GHz and at a wavelength of 1552 nm. The laser pulsewidth was measured using an autocorrelator 32, where the pulsewidth and output signal from nonlinear detector 22 were monitored as the accumulated net dispersion was varied, using a pair of tunable dispersion compensators (TDCs) 34 and 36. Fiber-based Bragg gratings can be used to form TDCs 34 and 36, where TDC 34 was designed to exhibit dispersion over the range of, for example, −300 to −700 ps/nm and TDC 36 was designed to exhibit dispersion over the range of, for example, +300 to +700 ps/nm.

The experimental data associated with this arrangement is illustrated in FIG. 3, along with the predicted nonlinear signal, as a function of pulsewidth based on the observed nonlinear exponent 1.7. The amplitude of the predicted signal was normalized to match the sensitivity of the experimental setup, and the results show that nonlinear detection can be used to infer the optical pulsewidth.

First-order polarization mode dispersion in optical fiber generally splits a polarized input signal pulse into two output pulses that have orthogonal polarization states. The output pulse polarizations are aligned with the principle states of polarization (PSP) of the fiber, and the temporal separation of the two pulses is determined by the differential group delay (DGD) associated with the fiber. The relative amplitude of the two pulses will then be determined by the initial launch polarization. For example, when the launch polarization is aligned with either one of the fiber PSPs, optical pulses will propagate through the fiber with essentially no distortion. When the launch polarization is oriented at 45° with respect to the fiber PSP, the pulses will exhibit essentially equal magnitude. For arbitrary launch polarizations, the two pulses will have arbitrary relatively amplitudes.

To understand the expected response of nonlinear detector 22 for these various possible conditions, it is easiest to consider the cases where the DGD of the fiber is significantly larger than the pulsewidth, so that the PMD-split pulses do not overlap in time. In this case, if one pulse has a fractional amplitude defined as "x", the other will have an amplitude of (1−x), and the response of nonlinear detector 22 can be expressed as follows:

$$S_{NL} = \eta T^2 P_{ave}^2 \cdot \frac{1}{\tau}[x^2 + (1-x)^2].$$

Therefore, the nonlinear signal will be maximized when x is either 0 or 1, this value being indicative of a launch polarization along a PSP to produce a single undistorted pulse. On the other hand, the nonlinear signal will exhibit a minimal value when x=0.5 and two equal pulses are produced.

Figure 4:
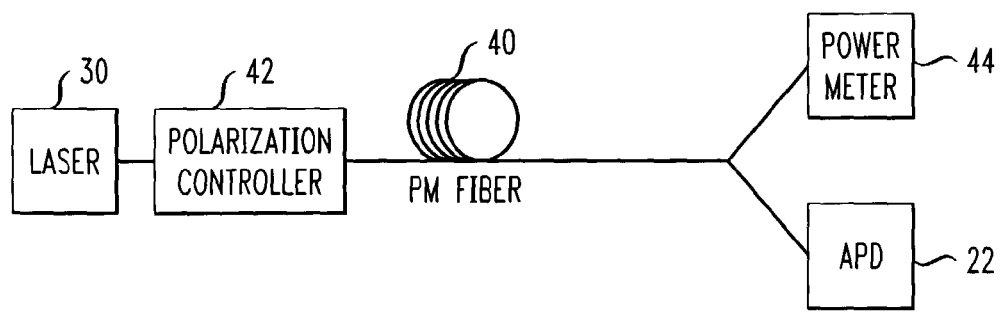
FIG. 4 illustrates a particular experimental arrangement for characterizing the polarization mode dispersion measurement capability of the nonlinear optical detector of FIG. 1.
Figure 5:
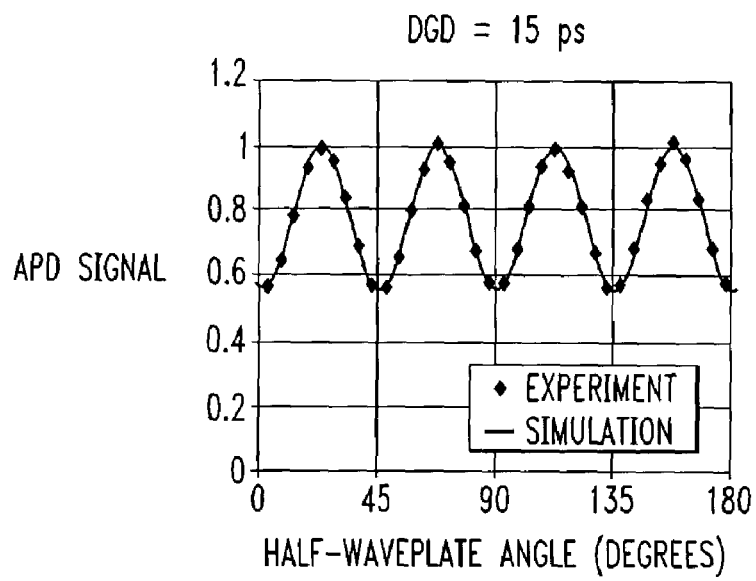
FIG. 5 contains a graph depicting both measured and expected polarization dependence in the output from the nonlinear optical detector of FIG. 1.

The arrangement in FIG. 4 can be used to analyze the ability of nonlinear detector 22 to measure polarization mode dispersion. In this case, the same laser 30 can be used as that shown in FIG. 2, thus generating 4 ps pulses at a rate of 10 GHz and a wavelength of approximately 1552 nm. Here, optical pulses were launched into 15 meters of polarization-maintaining fiber 40 to introduce approximately 15 ps of differential group delay (DGD). This value of DGD was chosen to be sufficiently longer than the 4 ps pulses produced by laser 30 so that the PMD pulse splitting produced pulses that did not overlap in time.

Using the arrangement of FIG. 4, a linear launch polarization was used and the orientation of the launch polarization was rotated with respect to the fiber PSP by rotating a half-wave plate in a polarization controller 42. In this particular arrangement, rotating the waveplate through an angle of θ results in imparting a polarization rotation of 2θ to the propagating optical signal. Referring to the results of FIG. 5, it was found that whenever the launch polarization matched one of the fiber PSP, a maximum was observed in the signal measured by nonlinear detector 22. Conversely, when the launch polarization was at an angle of 45° with respect to one of the PSP, a minimum power signal was measured by nonlinear detector 22. These measured variations in nonlinear detector 22 output signal, as well as the expected variation for a $P^{1.7}$ power dependence, are both shown in FIG. 5 where the agreement between the expected values and measured values are quite good. Since pulse distortion/splitting due to PMD is a serious problem in high-speed (i.e., >40 Gb/s) fiber optic transmission systems, the sensitivity of a nonlinear detector to the degree of PMD impairment is of significant potential value as a PMD impairment monitoring tool. Indeed, in an actively-controlled PMD compensating system, maximizing the signal detected by a nonlinear optical device will therefore minimize the PMD signal distortion.

As defined above, for a pulsed optical input with a bit period T and pulse duration τ, a quadratic nonlinear detector exhibits a response that is inversely proportional to the pulsewidth. A CW optical source (defined as optical "noise") can be considered to be simply a pulsed source with a bit period T and a pulse duration that is also T. For equal input powers, a nonlinear optical detector response will therefore be T/τ times bigger when the nonlinear detector is exposed to pulsed light than when it is exposed to CW light (noise). If the nonlinear detector is exposed to light that is partially pulsed and partially CW, the detector output signal at a given total CW input power will reflect the relative mixture of the two components, allowing for a measurement of ASE using the nonlinear device.

More quantitatively, for a fixed total power $P_{ave}$ defined as the combination of CW optical noise (at a fraction x of the total) and a pulsed optical signal (at a fraction of (1−x) of the total), the response of the nonlinear detector can be defined as follows:

$$S_{NL} = \eta P_{ave}^2 T\left[x^2 + \frac{T}{\tau}(1-x)^2\right]$$

Figure 6:
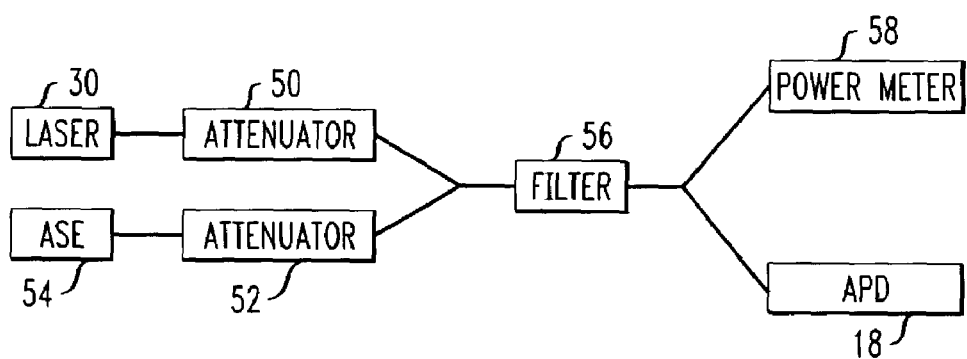
FIG. 6 illustrates a particular experimental arrangement for characterizing the ASE noise measurement capability of the nonlinear optical detector of FIG. 1.

The arrangement as illustrated in FIG. 6 can be used to determine the effectiveness of using nonlinear detector 22 to measure ASE noise in a DWDM system. In this example, a first variable attenuator 50 was used to adjust the relative power of the output pulses from laser source 30 and a second variable attenuator 52 was used to adjust the relative power of the output signal from a CW amplified spontaneous emission (ASE) broadband optical noise source 54. The combined light from laser 30 and ASE broadband source 54 were passed through a bandpass filter 56 so that their optical spectra exhibited similar profiles. The filtered signal was then measured by both nonlinear detector 18 and a power meter 58. The optical signal-to-noise ratio (OSNR) in this case was defined as the ratio of the total input power to the noise power. FIG. 7 illustrates the results for a fixed total input power of −15.6 dBm. Although there is a slight difference between the experimental data and the predicted data, there is good qualitative agreement and the data clearly shows that the nonlinear detector signal can be used to infer OSNR information up to an OSNR of approximately 10 dB (for this particular case where T/τ was approximately 20). Although the OSNR sensitivity will be reduced in typical applications (where T/τ is closer to 3), the nonlinear detector signal will different by a factor of approximately 3 when analyzing purely CW optical noise vs. purely pulsed optical signal and, therefore, the nonlinear detector can still be easily able to discriminate between these two types of signals.

Thus, it has been shown that the addition of a nonlinear optical detector with a conventional linear detector allows for an OPM used in DWDM transmission systems to provide information, on a channel-by-channel basis, regarding chromatic dispersion, polarization mode dispersion and accumulated ASE.

It will be apparent to those skilled in the art that other embodiments incorporation the disclosed concepts may be used. Accordingly, it is submitted that the invention should not be limited by the described embodiments but rather should encompass the spirit and full scope of the appended claims.

What is claimed is:

1. An optical performance monitor for measuring the operating characteristics of an optical transmission signal, the optical performance monitor comprising a linear optical detector responsive to the optical transmission signal for measuring the power of said optical transmission signal; and a nonlinear optical detector responsive to said optical transmission signal for generating a substantially quadratic, nonlinear output signal $S_{NL}$ determining signal distortions associated with: (1) chromatic dispersion, using the relation:

$$S_{NL}=\eta T^2 P_{ave}^2 \cdot 1/\tau,$$

where $\eta$ is a proportionality constant associated with the nonlinear detector, T is defined as the bit period of the optical transmission signal, $\tau$ is defined as the pulse duration of the optical transmission signal, and $P_{ave}$ is the average pulse power, the value of $\tau$ being an indicator of the presence of chromatic dispersion; (2) polarization mode dispersion, using the relation:

$$S_{NL}=\eta T^2 P_{ave}^2 \cdot 1/\tau [x^2+(1-x)^2],$$

where "x" is defined as the fractional amplitude of a first polarization state and (1−x) is defined as the fraction amplitude of a second, orthogonal polarization state; and (3) accumulated amplified spontaneous emission of said optical transmission signal using the relation:

$$S_{NL}=\eta P_{ave}^2 T[x^2+(T/\tau)(1-x)^2],$$

where the term T/$\tau$ is indicative of the amount of accumulated amplified spontaneous emission.

2. An optical performance monitor as defined in claim 1 wherein the nonlinear optical detector comprises a silicon avalanche photodiode.

3. An optical performance monitor as defined in claim 2 wherein the silicon avalanche photodiode generates an output signal $S_{NL}$ is proportional to the input power of the optical transmission signal raised to a value of 1.7.

4. An optical performance monitor as defined in claim 1 for use in a wavelength division multiplexed transmission system that utilizes a plurality of optical signals propagating at separate wavelengths, the monitor further comprising a wavelength-selective device for filtering out a particular wavelength signal to be applied as the input to the linear detector and the nonlinear detector.

5. An optical performance monitor as defined in claim 4 wherein the wavelength-selective device is tunable so as to select, as a function of time, a particular wavelength to be applied as an input to the linear detector and the nonlinear detector.

6. An optical performance monitor as defined in claim 4 wherein the wavelength-selective device comprises a Fabry-Perot filter.

7. An optical performance monitor as defined in claim 4 wherein the wavelength-selective device comprises a diffraction grating.

8. An optical performance monitor for use in a dense wavelength division multiplexed (DWDM) optical transmission system supporting a plurality of optical signals propagating at a plurality of separate wavelengths along a single transmission line, the monitor comprising a tapping element for removing a portion of the optical signal propagating along the single transmission line;

a wavelength-selective device for filtering and providing as an output an optical signal propagating at a selected wavelength from the plurality of separate wavelengths;

a linear optical detector responsive to the selected wavelength output from the wavelength-selective device for measuring the power of said selected wavelength optical signal; and a nonlinear optical detector responsive to the selected wave length output from the wavelength-selective device for producing as an output a substantially Quadratic. nonlinear signal $S_{NL}$ indicative of:(1) chromatic dispersion, using the relation:

$$S_{NL}=\eta T^2 P_{ave}^2 \cdot 1/\tau,$$

where $\eta$ is a proportionality constant associated with the nonlinear detector, T is defined as the bit period of the optical transmission signal, $\tau$ is defined as the pulse duration of the optical transmission signal, and $P_{ave}$ is the average pulse power, the value of $\tau$ being an indicator of the presence of chromatic dispersion: 2 polarization mode dispersion, using the relation:

$$S_{NL}=\eta T^2 P_{ave}^2 \cdot 1/\tau \ [x^2+(1)^2],$$

where "x" is defined as the fractional amplitude of a first polarization state and (1−x) is defined as the fraction amplitude of a second, orthogonal polarization state; and (3) accumulated amplified spontaneous emission noise present in the selected optical signal using the relation:

$$S_{NL}=\eta P_{ave}^2 T[x^2+(T/\tau)(1-x)^2],$$

where the term T/$\tau$ is indicative of the amount of accumulated am amplified spontaneous emission.

9. An optical performance monitor as defined in claim 8 wherein the nonlinear detector comprises a silicon avalanche photodiode.

10. An optical performance monitor as defined in claim 8 wherein the wavelength-selective device comprises a tunable Fabry-Perot filter.

11. An optical performance monitor as defined in claim 8 wherein the wavelength-selective device comprises a tunable diffraction grating.

* * * * *